United States Patent [19]

Bellegarda et al.

[11] Patent Number: 5,343,537
[45] Date of Patent: Aug. 30, 1994

[54] STATISTICAL MIXTURE APPROACH TO AUTOMATIC HANDWRITING RECOGNITION

[75] Inventors: Eveline J. Bellegarda; Jerome R. Bellegarda, both of Goldens Bridge; David Nahamoo, White Plains; Krishna S. Nathan, New York, all of N.Y.

[73] Assignee: International Business Machines Corporation, Armonk, N.Y.

[21] Appl. No.: 785,642

[22] Filed: Oct. 31, 1991

[51] Int. Cl.⁵ .............................................. G06K 9/00
[52] U.S. Cl. ........................................ 382/13; 382/30
[58] Field of Search ...................... 382/2, 3, 13, 30, 34

[56] References Cited

U.S. PATENT DOCUMENTS

| 4,731,857 | 3/1988 | Tappert | 382/9 |
| 5,029,223 | 7/1991 | Fujisaki | 382/13 |
| 5,075,896 | 12/1991 | Wilcox et al. | 382/39 |
| 5,105,468 | 4/1992 | Guyon et al. | 382/14 |
| 5,138,668 | 8/1992 | Abe | 382/13 |

FOREIGN PATENT DOCUMENTS

| 60-0157917 | 7/1985 | Japan | G06F 15/62 |
| 60-0297675 | 12/1985 | Japan | G06K 9/52 |
| 890074345 | 3/1989 | Japan | G10L 3/00 |
| 880155609 | 12/1989 | Japan | G06K 9/62 |

OTHER PUBLICATIONS

"Parametric estimation for normal mixtures"; Bezdek et al. Pattern Recognition Letters 3 (1985) 79–84 North-Holland.

"A Bayesian Approach to Clustering and Classification"; Karen B. Laskey ISSN#0-7893-0233-8/91 IEEE pp. 179–183 vol. 1 Oct. 16, 1991.

Primary Examiner—Leo H. Boudreau
Assistant Examiner—Chris Kelley
Attorney, Agent, or Firm—Jack M. Arnold; Robert P. Tassinari, Jr.

[57] ABSTRACT

Method and apparatus for automatic recognition of handwritten text based on a suitable representation of handwriting in one or several feature vector spaces(s), Gaussian modeling in each space, and mixture decoding to take into account the contribution of all relevant prototypes in all spaces. The feature vector space(s) is selected to encompass both a local and a global description of each appropriate point on a pen trajectory. Windowing is performed to capture broad trends in the handwriting, after which a linear transformation is applied to suitably eliminate redundancy. The resulting feature vector space(s) is called chirographic space(s). Gaussian modeling is performed to isolate adequate chirographic prototype distributions in each space, and the mixture coefficients weighting these distributions are trained using a maximum likelihood framework. Decoding can be performed simply and effectively by accumulating the contribution of all relevant prototype distributions. Post-processing using a language model may be included.

12 Claims, 13 Drawing Sheets

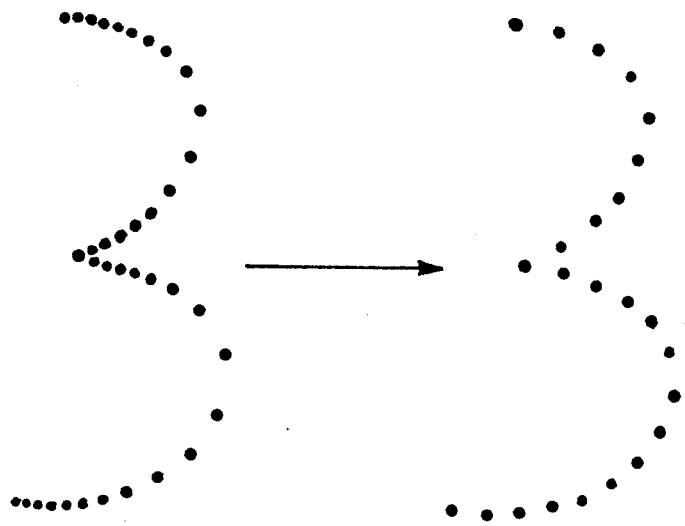
BALLISTICALLY SPACED
EQUALLY SPACED
FIG. 5
FIG. 6
FIG. 7
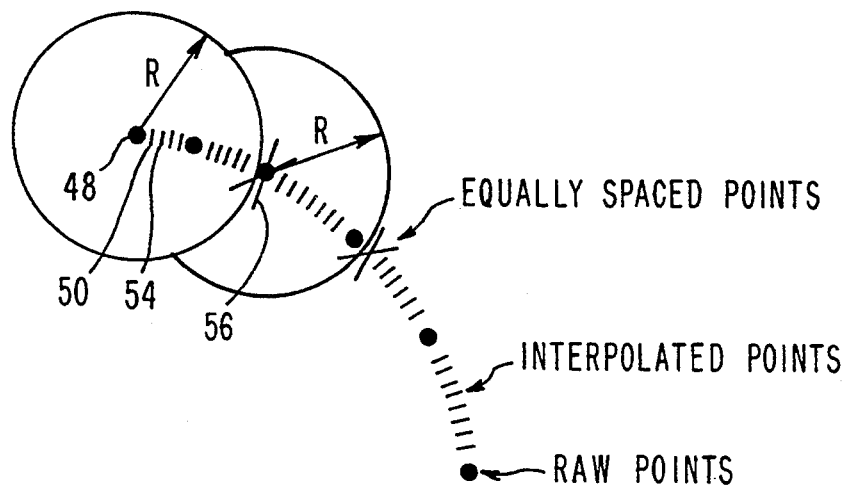

FIG. 9 (PRIOR ART)
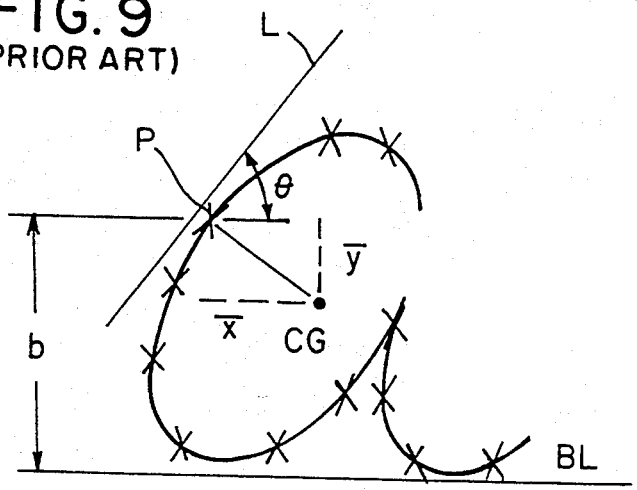
FIG. 10 (PRIOR ART)
$$\begin{bmatrix} \bar{x} \\ \bar{y} \\ b \\ \theta \end{bmatrix}$$
FIG. 11
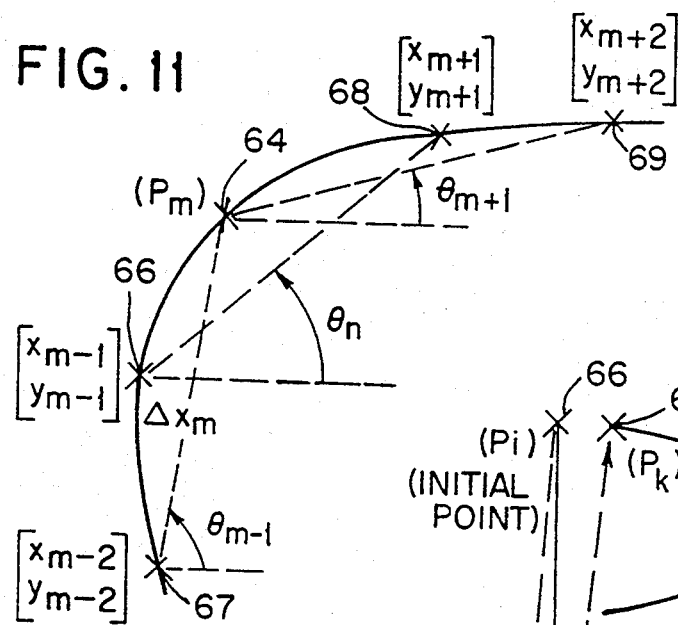
FIG. 13
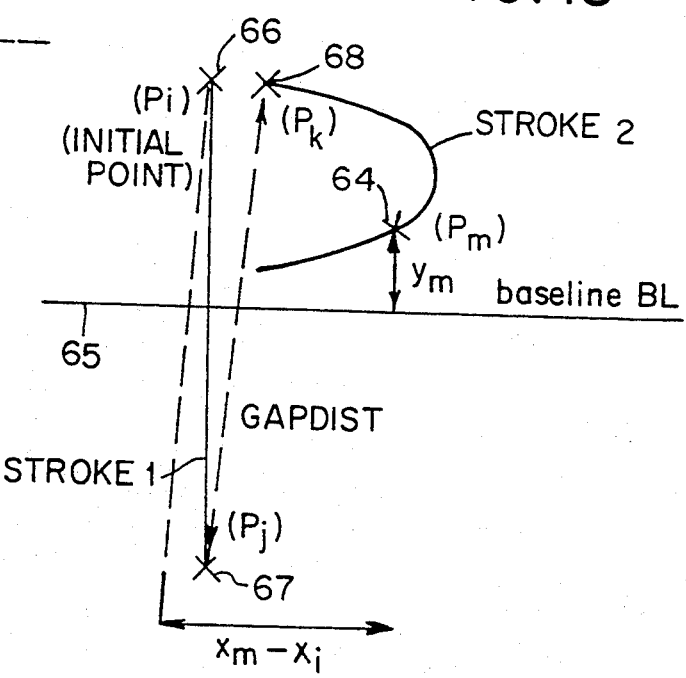

FIG. 12

LOCAL FEATURES
- $\Delta x_m = x_m - x_{m-1}$
- $\Delta y_m = y_m - y_{m-1}$
- $\cos\theta_m = \langle x_{m+1} - x_{m-1}\rangle / \sqrt{(x_{m+1} - x_m)^2 + (y_{m+1} - y_m)^2}$ } ESTIMATE OF SLOPE AT CURRENT POSITION
- $\sin\theta_m = \langle y_{m+1} - y_{m-1}\rangle / \sqrt{(x_{m+1} - x_m)^2 + (y_{m+1} - y_m)^2}$
- $\cos\theta_{m+1} - \cos\theta_{m-1}$ } ESTIMATE OF CURVATURE AT CURRENT POSITION
- $\sin\theta_{m+1} - \sin\theta_{m-1}$

FIG. 14

GLOBAL FEATURES
- $y_m$
- $x_m - x_i$
- $\text{gap dist} = \sqrt{(x_k - x_j)^2 + (y_k - y_j)^2}$  INTERSTROKE DISTANCE

STATISTICAL MIXTURE APPROACH TO AUTOMATIC HANDWRITING RECOGNITION

FIELD OF THE INVENTION

The invention is in the field of signal processing, and specifically is directed to handwriting recognition. In particular, the invention is directed to handwriting recognition based on a suitable representation of the handwriting in one (or several) feature vector space(s), Euclidean and Gaussian modeling in each space, and mixture decoding to take into account the contribution of all relevant prototypes in all spaces.

BACKGROUND OF THE INVENTION

Automatic systems purporting to recognize cursive script writing, or even handwritten characters, have so far met with only limited success. The reason for that can be traced largely to the lack of robustness exhibited by the templates used in the modeling of handwriting. For example, reference is made to U.S. Pat. No. 4,731,857 which describes a three-step procedure for the recognition of run-on handwritten characters. First, potential segmentation points are derived. Second, all combinations of the segments that could reasonably be a character are sent to a character recognizer to obtain ranked choices and corresponding scores. Third, the character sequences are combined so that the best candidate word wins. The recognition algorithm itself is a template matching algorithm based on dynamic programming. Each template is a fully formed character presumably representative of the writer's average way of forming this character, and the elastic matching scores of the current character are computed for each template. This strategy is vulnerable to the extensive variability that can be observed both across writers and across time.

The present invention is directed to devising a fast algorithm for handwriting recognition (i.e., of complexity similar to that of elastic matching as disclosed in U.S. Pat. No. 4,731,857 to Tappert) with an acceptable degree of robustness. This entails at least three crucial specifications: (i) the feature elements should be chosen such as to characterize handwriting produced in a discrete, run-on, cursive, or unconstrained mode equally well; (ii) these feature elements should be suitably processed so as to minimize redundancy and thereby maximize the information represented on a per-parameter basis; and (iii) the resulting feature parameters should be further analyzed to detect broad trends in the handwriting and enable appropriate modeling of these trends. These specifications are not met by the current elastic matching approach, since (i) it is character-based, and (ii) it simply averages several instances of a character to obtain a character template.

According to the present invention, the signal processing front-end is a great deal more sophisticated than that of elastic matching. Rather than merely chopping the input data into segments, the signal is transformed onto a higher dimensional feature space (chirographic space), whose points represent all raw observations after non-redundant feature extraction. Using a Gaussian (as opposed to Euclidean) measure for a more refined clustering, the prototypes in this space are formed for robustness purposes. Hence, each prototype represents a small building block which may be common to many characters. Instead of character sequences, building block sequences are combined, each of which is assigned a true likelihood defined on a bona fide probability space (as opposed to just a distance score). Finally, the recognition algorithm itself is a maximum a posteriori decoder operating on this probability space. This alternative strategy is better suited to meet specifications for robustness.

DISCLOSURE OF THE INVENTION

Automatic recognition of handwritten text is based on Euclidean and Gaussian modeling in a suitable feature vector space, and mixture decoding taking into account the contribution of all relevant prototypes in this space.

To obtain feature elements adequate for all modes of writing, the difference in coordinates from one point to the next is selected, as well as slope and curvature information, which are all translation-invariant. This provides adequate information about the local behavior of the pen trajectory. At the same time, it is important to collect information about the global behavior of the pen trajectory. Because in the case of cursive or unconstrained handwriting this information may be more difficult to estimate, the corresponding global feature elements should be handled separately from the local feature elements. In both cases, however, to minimize redundancy, the total covariance matrix of the resulting data is computed, the associated eigenvalues and eigenvectors are found, a linear transformation is applied along the directions of these eigenvectors, and the data is projected onto a sub-space of lower dimension. Finally, to detect the important building blocks in the handwriting, the reduced feature vectors are clustered into a comparatively small number of so-called chirographic prototypes, leading to a chirographic label alphabet representative of the elementary building blocks used in the writing process.

The above strategy can be implemented either on a writer-independent or on a writer-dependent basis. In the latter case, a set of chirographic prototypes is derived for each writer. This set is expected to capture the idiosyncrasies of the corresponding writer. To initialize the algorithm, the assumption is made that some handwriting has been recorded, so that for each stroke a sequence of (x,y) coordinate, corresponding to the current trajectory on the tablet, is available. Once the chirographic prototypes have been derived, recognition can be performed by simply computing the likelihood of each prototype producing the current feature vector, and mixing each individual likelihood together to obtain the final likelihood. In this approach, the mixing coefficients are the probabilities that each character in the vocabulary gives rise to a given prototype in the chirographic label alphabet.

BRIEF DESCRIPTION OF THE DRAWINGS

FIG. 5 illustrates a ballistically, spaced character which is input to the pre-filtering blocks of FIG. 4;

FIG. 6 illustrates an equally spaced character which is output From the pre-filtering block of FIG. 4;

FIG. 7 illustrates how the top ¼ of the ballistically spaced character of FIG. 5 is transformed to the equally spaced character of FIG. 6;

FIG. 9 illustrates a handwritten character being processed according to the prior art to generate a feature vector for a point (P);

FIG. 10 illustrates a four dimensional handwriting feature vector generated in the prior art for the point (P) of FIG. 9 by collecting a plurality of spatial attributes;

FIG. 11 illustrates a portion of a handwritten character being processed according to the teachings of the present invention to generate a first parameter vector for a point (P);

FIG. 12 illustrates a six dimensional local parameter vector generated for the point (P) of FIG. 11 by collecting a plurality of local spatial attributes;

FIG. 13 illustrates a handwritten character being processed according to the teachings of the present invention to generate a second parameter vector for a point (P);

FIG. 14 illustrates a three dimensional global parameter vector generated for the point (P) of FIG. 13 by collecting a plurality of global spatial attributes;

BEST MODE OF CARRYING OUT THE INVENTION

Figure 1:
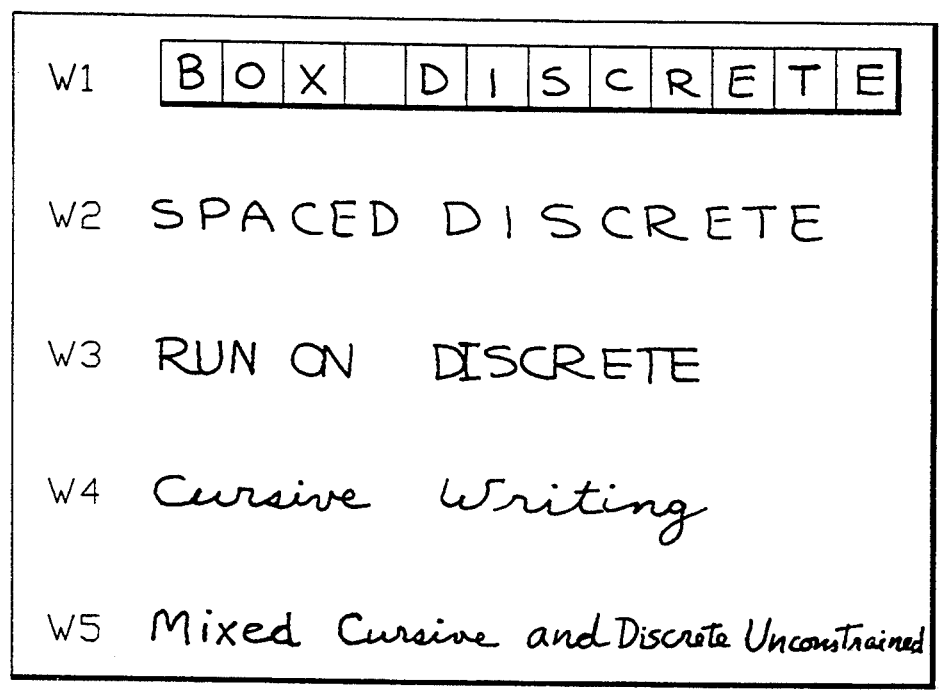
FIG. 1 provides examples of five different types of handwriting that may be input to the handwriting recognition system of the present invention.

In handwriting recognition, handwritten characters generally fall into five groups depicted in FIG. 1, the groups being depicted in increasing order of recognition complexity. Specifically, these groups include a first type of writing (W1) known as box discrete wherein individual characters are formed within predefined areas, or boxes, thereby simplifying the task of character segmentation. A second type of writing (W2) is known as spaced discrete wherein the user intentionally forms each character such that no character touches another. A third type of writing (W3) is known as run-on discrete wherein the user may form characters that touch, or "run-on" to, one another. A fourth type of writing (W4) is cursive writing wherein the user normally writes the whole word and subsequently crosses the t's and dots the i's and j's. Finally, a fifth type of writing (W5) is unconstrained writing wherein the user may use a mixture of run-on and cursive writing. This last type is the most difficult and presents the most complex segmentation and recognition task of the five styles depicted in FIG. 3.

Figure 2:
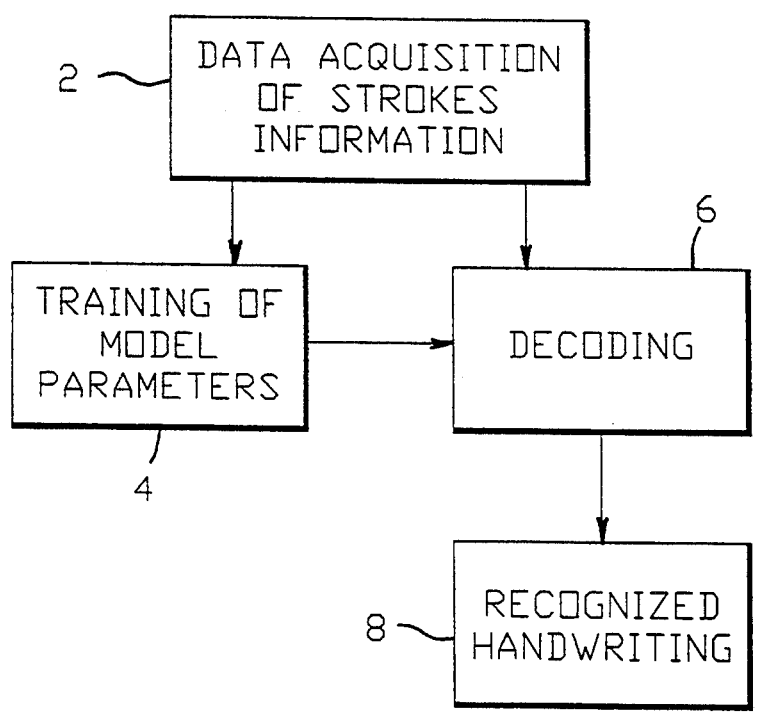
FIG. 2 is a block diagram of a generalized handwriting recognition system emphasizing training and decoding paradigms.

Referring to FIG. 2 there is illustrated in block diagram form, the operation of a general handwriting recognition system. A generalized discussion of FIG. 2 is first provided followed by a detailed description of the operation of each of the blocks shown therein. At block 2 there occurs data acquisition of stylus or pen stroke information. Acquired strokes are operated on to recognize the handwriting information. During a training mode of operation as shown at block 4 the acquired handwriting information is analyzed, in reference to a known, training script, to train the underlying models purporting to represent this information. During use, the model parameters obtained during training are used by a decoding block 6, together with the feature vectors corresponding to the (unknown) handwriting to be recognized. Specifically, the decoding block 6 employs the models to generate candidate characters from assemblages of individual feature vectors. The decoder selects the most probable character based upon the relevant model parameters.

Recognized handwriting is thereafter made available for use by block 8. By example, a recognized message may be simply converted to an alphanumeric format and displayed upon a display device. The recognized message may also be provided to any application that would conventionally receive messages from a keyboard such as, by example, a word processing system.

The following algorithm is implemented in the apparatus comprising the handwriting recognition system of the invention. The steps of the algorithm are as follows:

1. Perform a pre-filtering of the data to normalize for the speed of writing. This is accomplished by converting the time-dependent representation captured by the tablet, where the spacing between points is ballistic in nature, into a time-independent representation, where all the points are equally spaced. Linear-interpolation is performed as necessary to find the resulting equally spaced points. If desired, a cubic spline interpolation can also be performed for a more refined interpolation.

2. For each point $P_n$ of coordinate $(x_n, y_n)$ in the training data, forms a P-dimensional vector $\vec{p}_n$ of feature elements representative of the local pen trajectory around $P_n$. For example, a good choice for P is 6, with feature elements given by: (i) the horizontal and vertical incremental changes:

$$\Delta x_n = x_n - x_{n-1}, \Delta y_n = y_n - y_{n-1}; \tag{1}$$

(ii) the sine and cosine of the angle of the tangent to the pen trajectory at $P_n$:

$$\cos\theta_n = \Delta x_n / \sqrt{(\Delta x_n)^2 + (\Delta y_n)^2}, \tag{2}$$

$$\sin\theta_n = \Delta y_n / \sqrt{(\Delta x_n)^2 + (\Delta y_n)^2};$$

and (iii) the incremental changes in the above two parameters:

$$\Delta \cos \Theta_n = \cos \Theta_{n+1} - \cos \Theta_{n-1},$$
$$\Delta \sin \Theta_n = \sin \Theta_{n+1} - \sin \Theta_{n-1}. \quad (3)$$

Note that the last two parameters provide information about the curvature of the pen trajectory at point $P_n$.

3. For each point $P_n$ of coordinates $(x_n, y_n)$ in the training data, form a $P'$-dimensional vector $\vec{P}'_n$ of feature elements representative of the global pen trajectory up to $P_n$.

For example, a good choice for $P'$ is 3, with feature elements given by: (i) the height from the baseline $y_n$, (ii) the width from the beginning of the stroke $x_n - x_i$, where $x_i$ is the first coordinate of the current stroke, and (iii) the inter-stroke distance if the current character is composed of more than one stroke.

4. For each stroke in the training data, determine a subset of the points $P_n$ in that stroke, say $Q_i$, with the property that the $Q_i$'s are approximately equally spaced. This set should always include the first and last points of each stroke, and the spacing interval should be some reasonable function of the line height.

5. At each location $Q_i$ obtained in Step 4, construct a Q-dimensional spliced vector by concatenating together the H vectors $\vec{p}_n$ preceding $Q_i$, the vector $\vec{q}_i$ corresponding to $Q_i$, and the H vectors $\vec{p}_n$ following $Q_i$. Similarly, construct a Q'-dimensional spliced vector by concatenating together the H' vectors $\vec{p}'_n$ preceding $Q_i$, the vector $\vec{q}'_i$ corresponding to $Q_i$, and the H' vectors $\vec{p}'_n$ following $Q_i$. This is realizable provided the following holds:

$$Q = P(2H+1), \quad Q' = P'(2H'+1) \quad (4)$$

Good choices are $H = H' = 20$, yielding values $Q = 246$ and $Q' = 123$.

6. Compute the mean vector and covariance matrix of all the Q-dimensional vectors corresponding to local handwriting features. Denote these as $M_t^{(1)}$ and $S_t^{(1)}$, respectively. Similarly, compute the mean vector and covariance matrix of all the Q'-dimensional vector corresponding to global handwriting features. Denote these are $M_t^{(2)}$ and $S_t^{(2)}$, respectively.

7. For $n = 1,2$ compute $E_t^{(n)}$, the eigenvector matrix of $S_t^{(n)}$, and $\Lambda_t^{(n)}$, the diagonal matrix of corresponding eigenvalues. Note that these quantities obey the relationship:

$$S_t^{(n)} = E_t^{(n)} \Lambda_t^{(n)} E_t^{(n)T}, \quad (5)$$

where T denotes matrix transposition. Thus, the leading eigenvectors in $E_t^{(n)}$ correspond to the leading eigenvalues in $\Lambda_t^{(n)}$.

8. Using the $R_1$ leading eigenvectors from Step 7, project the Q-dimensional feature vectors of Step 5 onto a space of dimension $R_1$. Call the resulting vectors $\vec{r}_i^{(1)}$. A reasonable value for $R_1$ is 6. At this point the redundancy present in the Q-dimensional spliced feature vectors has been eliminated by concentrating on the most informative feature elements. We call the space spanned by the vectors $\vec{r}_i^{(1)}$ the chirographic space $C^{(1)}$.

9. Similarly, using the $R_2$ leading eigenvectors from Step 7, project the Q'-dimensional feature vectors of Step 5 onto a space of dimension $R_2$, with resulting vectors $\vec{r}_i^{(2)}$. A reasonable value for $R_2$ is 15. Note that $R_2 > R_1$ because there is generally less redundancy present in the (global features) Q-dimensional spliced feature vectors than in the (local features) Q-dimensional spliced feature vectors. We call the space spanned by the vectors $\vec{r}_i^{(2)}$ the chirographic space $C^{(2)}$.

10. Repeat this step for $n = 1,2$. Starting with random cluster assignments, perform K-means Euclidean clustering of the projected vectors $\vec{r}_i^{(n)}$ obtained in Steps 8 and 9, so as to obtain preliminary prototype distributions in the corresponding $R_n$-dimensional chirographic space.

11. Repeat this step for $n = 1,2$. Starting with the preliminary distributions of Step 10, perform K-means Gaussian clustering of the projected vectors $\vec{r}_i^{(n)}$ obtained in Steps 8 and 9, so as to obtain final Gaussian prototype distributions in both chirographic spaces. Denote these prototype distributions as $\pi_k^{(n)}$, and use cluster sizes to estimate the prior probability $\Pr(\pi_k^{(n)})$ of each prototype distribution in the respective $R_n$-dimensional chirographic space.

12. Repeat this step for $n = 1,2$. Using the Gaussian distributions from Step 11 compute, for all vectors $\vec{r}_i^{(n)}$ obtained in Steps 8 and 9, the quantity $\Pr(\vec{r}_i^{(n)} | \pi_k^{(n)})$. Also estimate the probability of each feature vector as:

$$Pr(\vec{r}_i^{(n)}) = \sum_{k=1}^{K_n} Pr(\vec{r}_i^{(n)} | \pi_k^{(n)}) Pr(\pi_k^{(n)}), \quad (6)$$

assuming the total number of clusters in the respective chirographic space is $K_n$. Good choices are $K_1 = K_2 = 400$.

13. Repeat this step for $n = 1,2$. Using the results of Steps 11 and 12, compute the quantity:

$$Pr(\pi_k^{(n)} | \vec{r}_i^{(n)}) = \frac{Pr(\vec{r}_i^{(n)} | \pi_k^{(n)}) Pr(\pi_k^{(n)})}{Pr(\vec{r}_i^{(n)})} \quad (7)$$

and note against which character $a_j$ each vector $\vec{r}_i^{(n)}$ is aligned in the training data.

14. Repeat this step for $n = 1,2$. For each character $a_j$ in the vocabulary considered, pool together all the $\vec{r}_i^{(n)}$ which have been aligned against it and accumulate the corresponding $\Pr(\pi_k^{(n)} | \vec{r}_i^{(n)})$. After normalization, this provides an estimate of $\Pr(\pi_k^{(n)} | a_j)$ the prior probability of each prototype distribution in the respective chirographic space given each character $a_j$. This is the end of the training phase.

15. Repeat Steps 1–5 and 8–9 on the test data, so as to produce test feature vectors in the same respective chirographic spaces as the training data.

16. For each frame of data $f_i$, represented in the chirographic space $C^{(1)}$ by $\vec{r}_i^{(1)}$ and in the chirographic space $C^{(2)}$ by $\vec{r}_i^{(2)}$, use the Gaussian mixture distributions obtained in Step 11 and the prior probabilities obtained in Step 14 to form the quantity:

$$Pr(f_i | a_j) = Pr(\vec{r}_i^{(1)} | a_j) Pr(\vec{r}_i^{(2)} | a_j)) = \quad (8)$$
$$\left( \sum_{k=1}^{k_1} Pr(\vec{r}_i^{(1)} | \vec{\pi}_k^{(1)}) Pr(\vec{\pi}_k^{(1)} | a_j) \right)^{1-\alpha} \left( \sum_{k=1}^{k_2} Pr(\vec{r}_i^{(2)} | \vec{\pi}_k^{(2)}) Pr(\vec{\pi}_k^{(2)} | a_j) \right)^{\alpha}$$

i.e., the weighted product of two single Gaussian mixture distributions covering the entire chirographic label alphabet. In this expressions, $\alpha$ controls the influence of the second codebook relative to the first. A good value for $\alpha$ is 0.7. The term:

$$\Pr(\vec{r}_i^{(n)}|\vec{\pi}_k^{(n)})\Pr(\vec{\pi}_k^{(n)}|a_j)$$

is defined as the "component character match score", and the summation of the component character match score over $K=1$ to $k_n$ is defined as the "partial character match score" for a character and a feature vector signal. It remains to multiply the scores of successive frames to obtain the overall score i.e., "full character match score", for a tentative sequence of frames, thus completing the decoding process.

Figure 3:
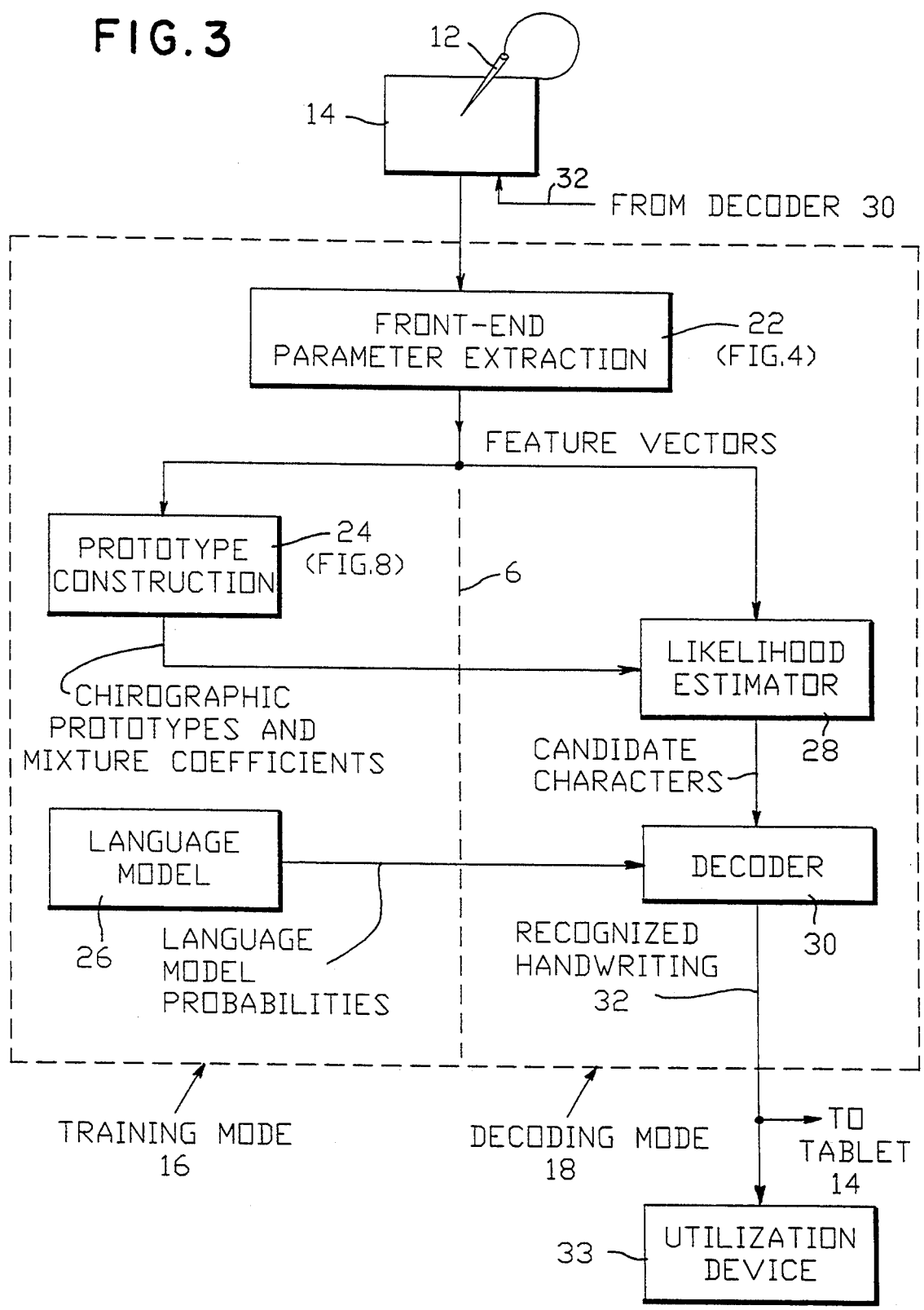
FIG. 3 is a block diagram of a handwriting recognition system according to the present invention.

Refer now to FIG. 3, which is a block diagram of a handwriting recognition system according to the present invention for implementing the just recited algorithm. A general purpose computer 10, which for example may be an IBM 3090/VF or an IBM RS 6000, receives character or stroke information produced by a user using a stylus 12 to write on an electronic tablet 14. The character or stroke information may be displayed on the electronic tablet 14 or another display device (not shown). The computer 10 can be used either in training mode 16 or in decoding mode 18.

This is symbolically represented by a dotted line 20. In either training or decoding mode a front-end parameter extraction block 22 must be applied. In training mode 16 the algorithm includes a prototype construction block 24 and a language model block 26. In decoding mode 18 the algorithm includes a likelihood estimator 28 and a decoder 30.

The blocks 22-30 are shown as functional program modules, however it is to be appreciated that some or all of these functional blocks may be implemented in hardware form instead of software form, and be within the claimed teachings of this invention.

The front-end parameter extraction block 22, which performs steps 1 to 9 of the handwriting recognition algorithm, provides feature vectors to the prototype construction block 24, during training mode, or the likelihood estimator block 28, during decoding mode. The prototype construction block 24 performs steps 10-14 of the handwriting recognition algorithm to produce (i) chirographic prototypes representing suitable portions of characters and (ii) mixture coefficients indicating how to combine them. This information is used in the decoding mode to determine or recognize, unknown characters. The language model block 26 provides language model probabilities which can be used to determine what characters are most likely to occur in a given context, or what words are most likely to occur in a given context. In some embodiments, block 26 may be reduced to a library of probable combinations of characters, phrases or sentences occurring in handwriting. This language model is utilized by the decoder 30 during recognition.

During the recognition mode, likelihood estimator 28, which performs step 16 of the handwriting recognition algorithm, receives feature vectors from block 22 which have been produced from the unknown strokes or characters to be recognized. These feature vectors lie in the same chirographic space(s) as the chirographic prototypes from block 24, and can therefore be compared to each of them to evaluate the contribution of each of them to each particular feature vector. This information is integrated using the mixture coefficients produced during training to compute the likelihood that each particular feature vector "belongs" to a character in the alphabet. Over all the feature vectors, this can be used to produce candidate characters for recognition to decoder 30. Decoder 30 integrates into the overall score the language model probabilities from block 26 corresponding to the maximum score. Recognized handwriting in accord with the recited algorithm is then produced at output 32 of decoder 30. The recognized handwriting may then be displayed on the tablet 14, or may be provided to a utilization device 33, which for example may be a display device, printer, application program or the like.

Figure 4:
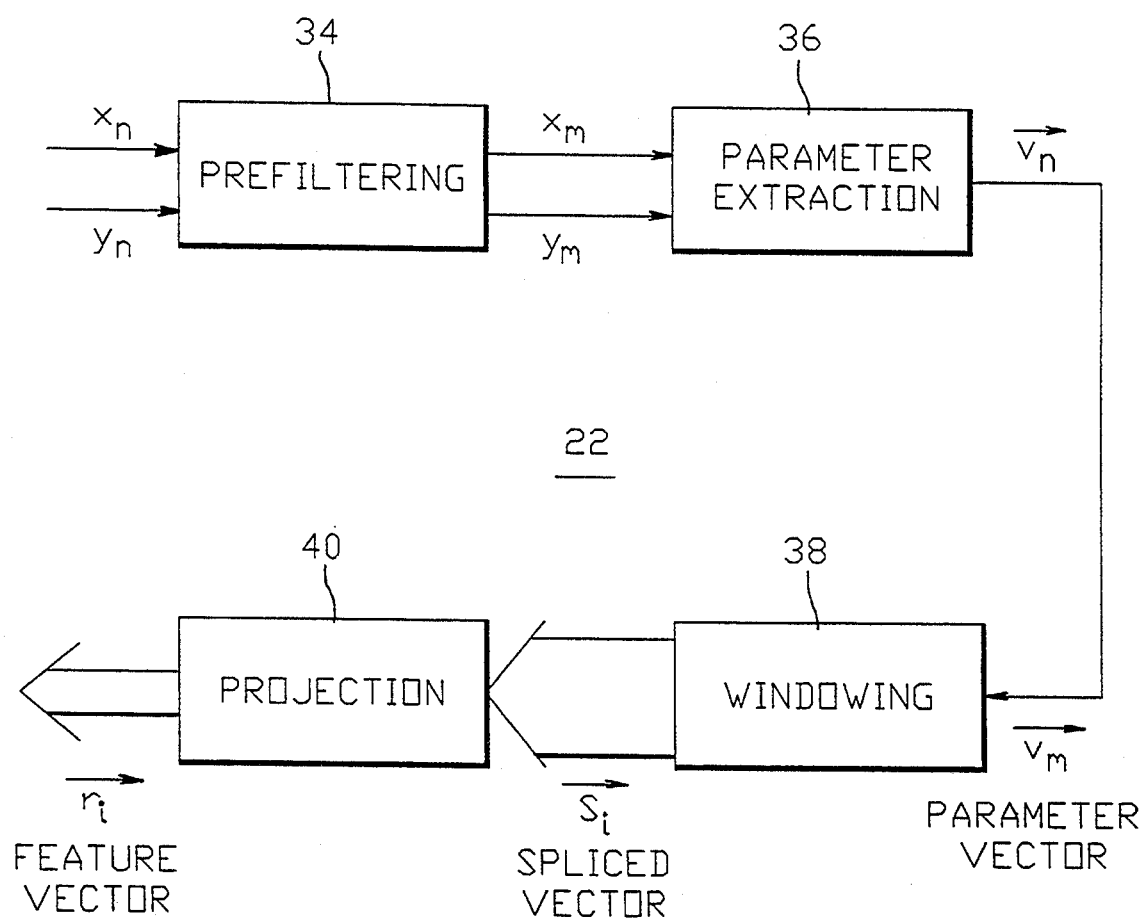
FIG. 4 is a detailed block diagram of the front-end parameter extraction block which is shown generally in FIG. 3.

Refer now to FIG. 4 which is a detailed block diagram of front-end parameter extraction block 22 which is shown generally in FIG. 3. Each sampled point of handwriting is represented by a point which is defined by coordinates $x_m$ and $y_m$ which are provided to a pre-filtering block 34 which performs step 1 of the handwriting recognition algorithm. These points are ballistically spaced as shown in FIG. 5. That is, the spacing of the points is a function of the velocity or speed of writing which the writer used to form the current character. For a variety of reasons, writers are seldom consistent in their velocity or writing speed, which may introduce high error rates in handwriting recognition. The pre-filtering block 34 normalizes the points of FIG. 5 to provide equally spaced points $x_m$ and $y_m$ at the output of block 34, and as shown in FIG. 6. Details of the pre-filtering will be described shortly relative to FIGS. 7 and 8. The equally spaced points $x_m$ and $y_m$ comprising a character as shown in FIG. 6, are provided to a parameter extraction block 36, which performs steps 2 and 3 of the handwriting recognition algorithm, for providing the vector $\vec{v}_m$. Details of this parameter extraction are described shortly relative to FIGS. 11, 12, 13, and 14. The vector $\vec{v}_m$ is provided to a windowing block 38, which performs steps 4 and 5 of the handwriting recognition algorithm, for providing a spliced vector $\vec{S}_i$. Details of how the spliced vector $\vec{S}_i$ is provided is described shortly relative to FIGS. 14, 15 and 16. The spliced vector $\vec{S}_i$ is provided to a projection block 40, which performs steps 6-9 of the handwriting recognition algorithm, for producing a feature vector $\vec{r}_i$. This eliminates redundancy in the spliced parameter vectors. Details of the function of block 40 are set forth relative to FIG. 17. Projection block 40 responds to the spliced vector $\vec{S}_i$ to provide a feature vector $\vec{r}_i$ which is provided to the prototype construction block 24 and the likelihood estimator 28, as previously explained with respect to FIG. 3. Details of projection block 40 are set forth relative to the flow chart of FIG. 17.

Figure 8:
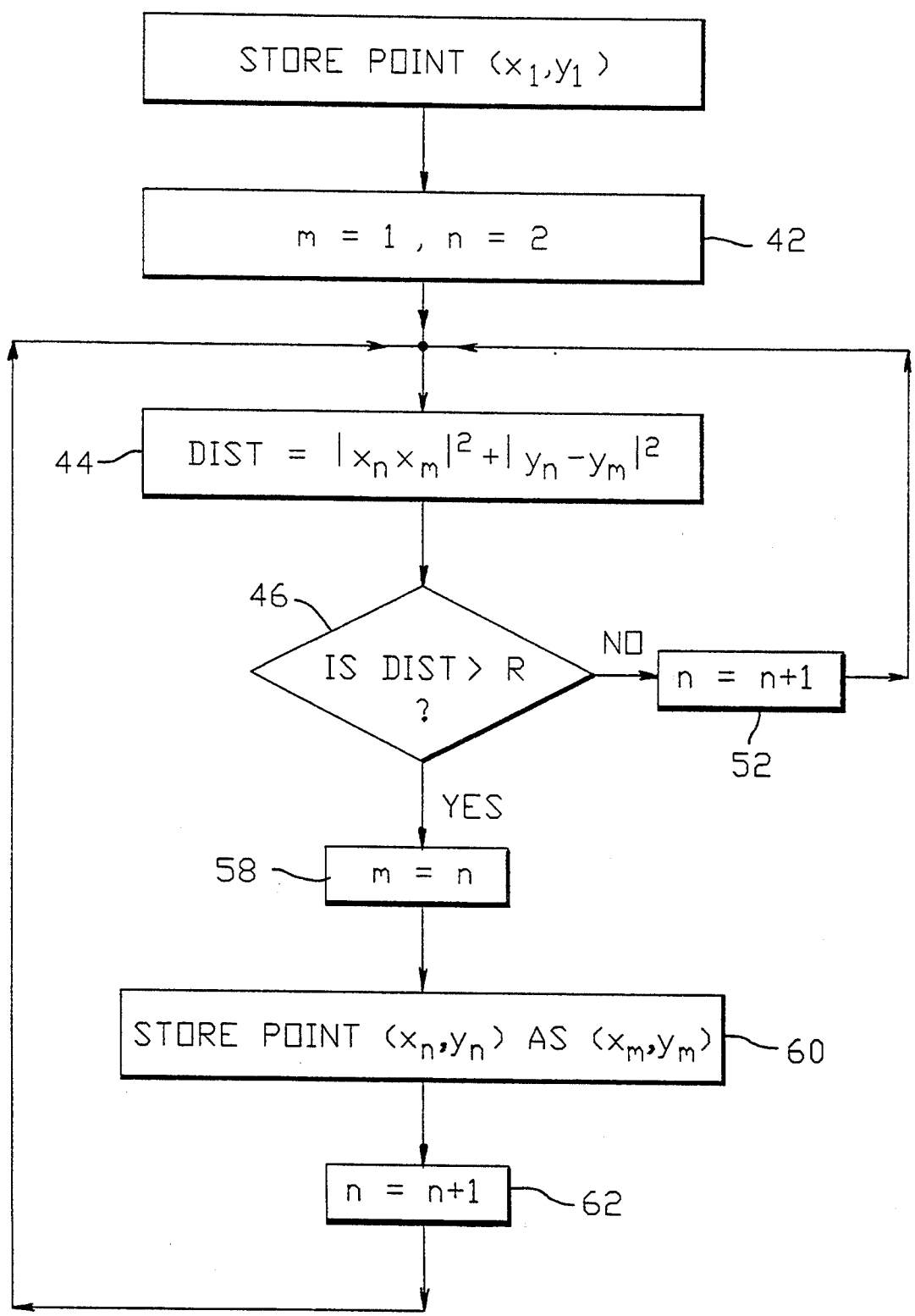
FIG. 8 is a flow chart detailing how the pre-filtering block of FIG. 4 functions to transform the ballistically spaced character of FIG. 5 to the equally spaced character of FIG. 6.

Details of how the ballistically spaced character of FIG. 5 is normalized by pre-filtering block 34 (FIG. 4) to produce the equally spaced character of FIG. 6 is now explained relative to FIGS. 7 and 8 which illustrate how step 1 of the handwriting recognition algorithm is performed. FIG. 7 is representative of the upper ¼ curved portion of FIG. 5. First, the density of points is increased by performing some interpolation between the original raw points (denoted by a dot •). This results in a sequence of points comprising the original raw points (•) and the interpolated points (|). Then, filtering is accomplished by a priori determining that equal spacing between points is a distance R suitably related to the distance between two pels as manifested on the electronic tablet 14 (FIG. 3). In FIG. 7, this results in a sequence of points after filtering denoted by an X (at 56). Raw and interpolated points are considered to be at non-equally spaced integer points n, and filtered points are considered to be at equally-spaced integer points m.

With respect to FIG. 8, at block 42 the position at n=1 at the first (raw) point 48 of the stroke is designated at m=1, considered also the first filtered point. The second point 50 of the stroke at n=2 is the first point to be tested for filtering. At block 44 the (Euclidean) distance between the points m and n is determined according to the relationship:

$$\text{distance} = |x_n - x_m|^2 + |y_n - y_m|^2$$

At block 46 a determination is made whether or not distance is greater than R. With reference to FIG. 7 point m=1 is point 48 and point n=2 is point 50. It can be seen that distance is less than R in FIG. 7, therefore the point is rejected and we proceed to block 52 where n is incremented to 3, point 54. Distance is again computed in block 44 and compared with R in block 46. Eventually the distance becomes greater than R, so the point 55 is accepted (m is made equal to n in block 58). At block 60 the point $(x_n, y_n)$ is stored as a filtered point $(x_m, y_m)$ which is the point 56, which is the 12th point. At block 62 n is incremented by 1, and a return is made to block 44 where raw and interpolated points are treated as explained above.

FIGS. 9 and 10 illustrate how a feature vector is derived in the prior art, in reference to a center of gravity (CG) of a stroke. The input stroke, by example a lower-case "a", is captured by the electronic tablet. Each feature vector includes elements expressive of an x and a y displacement of a sample point (P) on the stroke, relative to the center of gravity, a displacement (b) of P relative to a baseline (BL), and angular information (theta) relating to a line (L) tangent to P. The resulting feature vector, for this presently preferred embodiment, has four elements (FIG. 10) and thus represents a four dimensional (4-d) vector.

FIGS. 11, 12, 13 and 14 illustrate how parameter extraction, block 36 of FIG. 4, which performs steps 2 and 3 of the handwriting recognition algorithm, is derived according to this invention for providing a parameter vector $\vec{v}_m$. FIG. 11 shows the local parameter extraction, FIG. 12 the local parameter vector, FIG. 13 is the global parameter extraction, and FIG. 14 the global parameter vector. There are 6 local coordinates in the local parameter vector and 3 global coordinates in the global parameter vector, for a total of 9 coordinates. That is, 5 more coordinates are generated than the 4 coordinates of the prior art as shown in FIG. 10. For the local parameter vector, calculations are made relative to a current point 64 relative to previous points 66 and 67 and following points 68 and 69. The specific calculation for local parameter vectors are shown in FIG. 12. For the global parameter vector, calculations are made relative to a current point 64 relative to baseline 65, initial point of the character 66, last point of the first stroke 67, and first point of the second stroke 68. The specific calculation for global parameter vector are shown in FIG. 14. Without loss of generality, the rest of this section will illustrate the handwriting recognition algorithms for one codebook only, i.e., either the local parameter vectors or the global parameter vectors.

Figure 15:
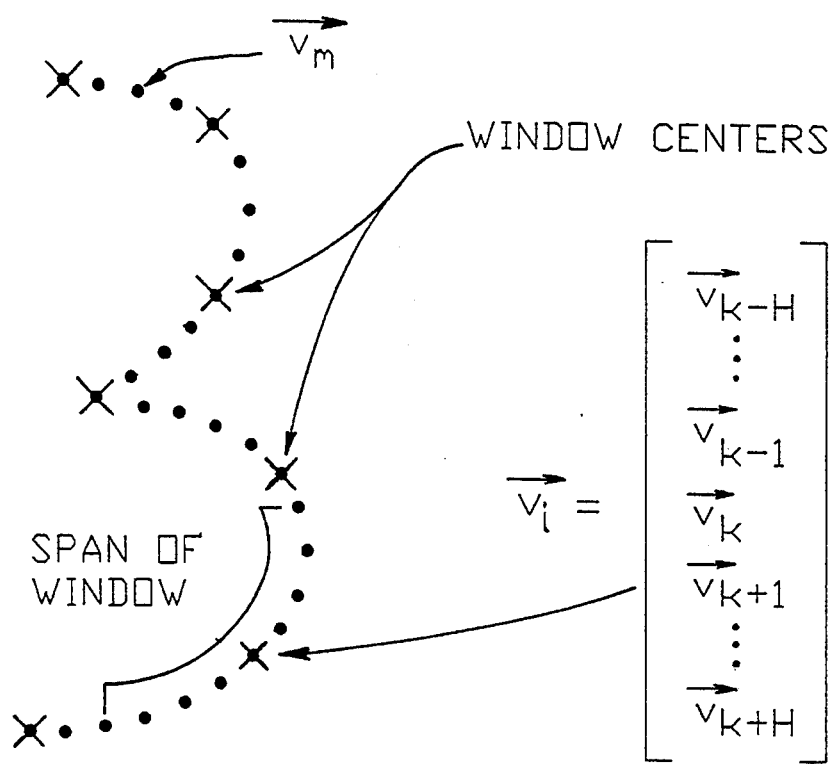
FIG. 15 illustrates how windowing is accomplished on a character by concatenation of individual parameter vectors as extracted in FIGS. 12 and 14.
Figure 16:
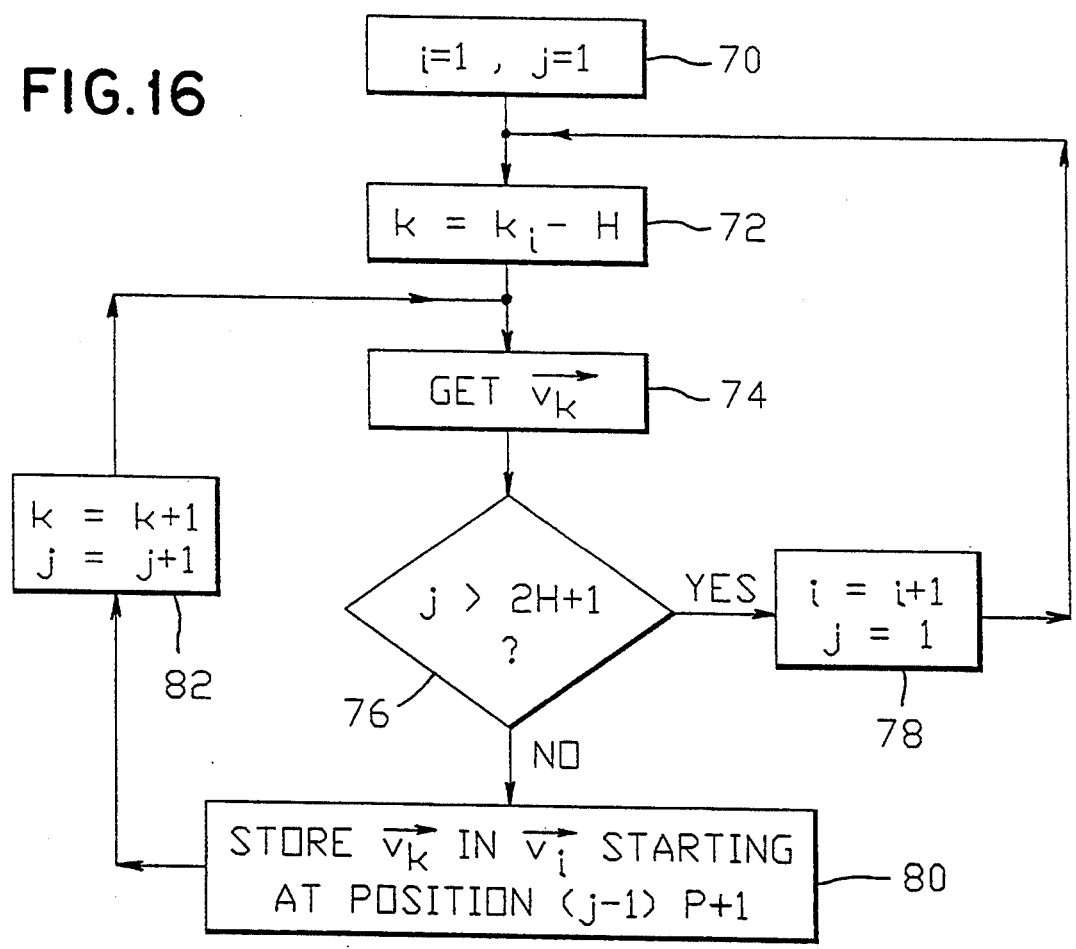
FIG. 16 is a flow chart detailing how the windowing block of FIG. 4 functions to perform the concatenation of the parameter vectors illustrated in FIG. 15 and thereby produce spliced vectors.

Details of the windowing block 38 of FIG. 4 are now set forth relative to FIGS. 15 and 16 to show how feature events are extracted from the data. A small number of approximately equidistant feature points are determined using the same algorithm as in FIG. 8, but with a different value of R, and parameter vectors are spliced at those points. The number (2H+1) of parameter vectors to be spliced at each point is determined a priori, which in turn specifics the splicing dimension Q=(2H+1)P.

Referring to FIG. 15, feature points are shown by dots, and window centers are shown by an X. Dots are referenced as points k, and X's are referenced by index i as points $k_i$. With respect to FIG. 16, at block 70 i and a counter j are each set equal to 1. At block 72, k is set to $k_i$-H, and at block 74 the corresponding $\vec{v}_k$ (of dimension P) is gotten. A determination is then made at block 76 whether or not (2H+1) $\vec{v}_k$ have been seen. If so, j is reinitialized to 1 and i is incremented by 1 in block 78 and the procedure repeats as just explained. If not, $\vec{v}_k$ is appended to $\vec{V}_i$ starting at position (j−1) P+1. k and j are both incremented by 1 in block 82 and a return is made to block 74 to get the next $v_k$, and the procedure repeats as just explained.

Figure 17:
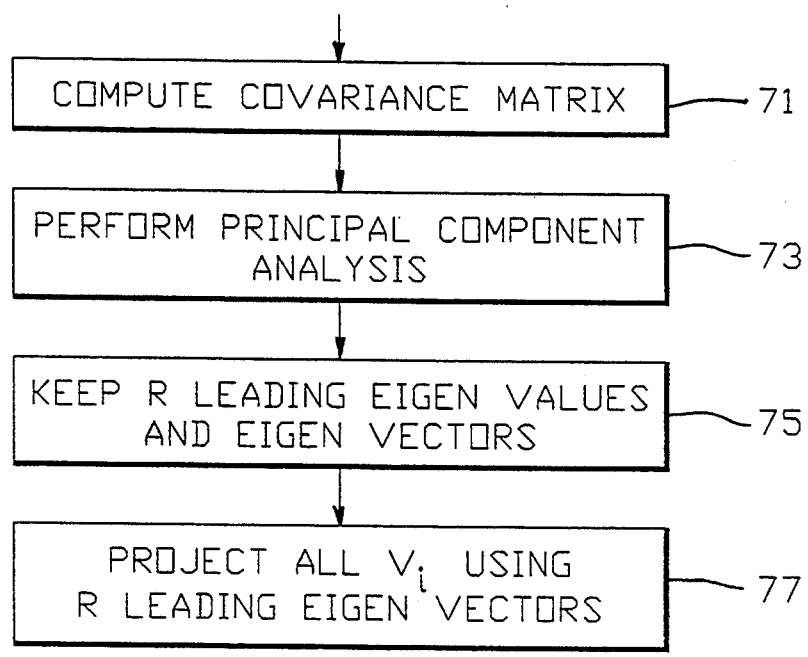
FIG. 17 is a flow chart detailing how the projection block of FIG. 4 functions to produce a feature vector from the spliced vectors obtained in FIG. 16.

Referring to FIG. 17 the function of the projection block 40 of FIG. 4, which performs steps 6-9 of the handwriting recognition algorithm, is explained in detail. The projection block is utilized to eliminate redundancy in the spliced parameter vectors from the windowing block 38. A covariance matrix is computed for all spliced vectors in block 71, and the associated eigenvalue and eigenvectors are found through principal component analysis, in block 75. Using the R leading eigenvalues and eigenvectors of block 74, the spliced vectors are projected in block 77 onto a subspace of smaller dimension called chirographic space, resulting in the projected vectors $\vec{r}_i$. How a covariance matrix is computed is described in "Matrix Computations" by J. H. Golub and C. F. Van Loan, John Hopkins, University Press, Baltimore, 1989. This references also teaches how to perform a principal component analysis at block 73, and how to project all $S_i$ at block 77.

Figure 18:
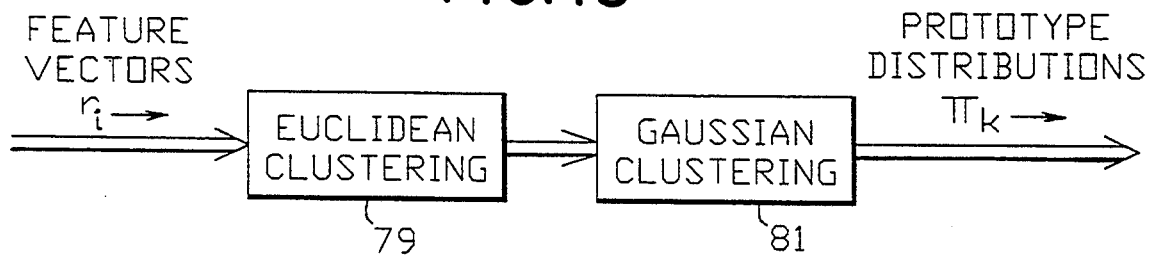
FIG. 18 is a detailed block diagram of the prototype construction block of FIG. 3.
Figure 19:
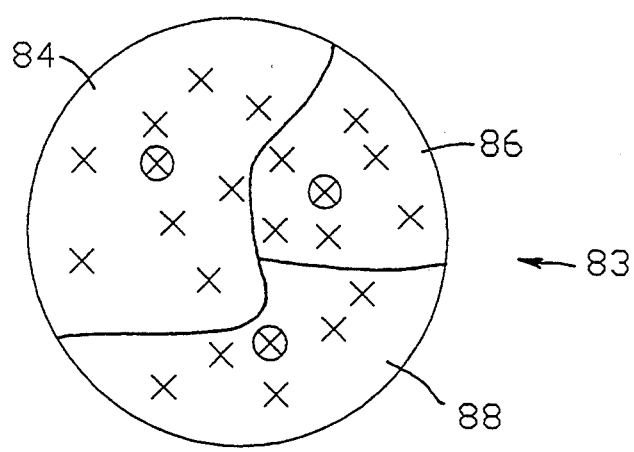
FIG. 19 is a diagram illustrating K-means clustering.

The chirographic space is then partioned as shown in FIG. 18 and 19, which details the prototype construction block 24 of FIG. 3, to produce chirographic prototypes. The feature vectors are provided to block 79 to perform k-means Euclidean clustering. Details of block 79 are set forth relative to FIGS. 19 and 20. The results of Euclidean clustering are provided to block 81 to perform k-means Gaussian clustering to provide prototype distributions $\vec{\pi}_k$. Details of block 81 are set forth relative to FIG. 21. FIGS. 18-21 detail how steps 10 and 11 of the handwriting recognition algorithm are performed. The prototype distributions or chirographic prototypes are provided to likelihood estimator 28 (FIG. 3) to produce candidate characters to decoder 30 (FIG. 3). How to generally accomplish k-means clustering is described in "Clustering Algorithms" by J. A. Hartigan, J. Wiley, 1975.

FIG. 19 illustrates a space 83 which is divided into clusters 84, 86 and 88. Each cluster includes a plurality of vectors indicated as points x, with a centroid ⊗ being computed for each such cluster of vectors.

Figure 20:
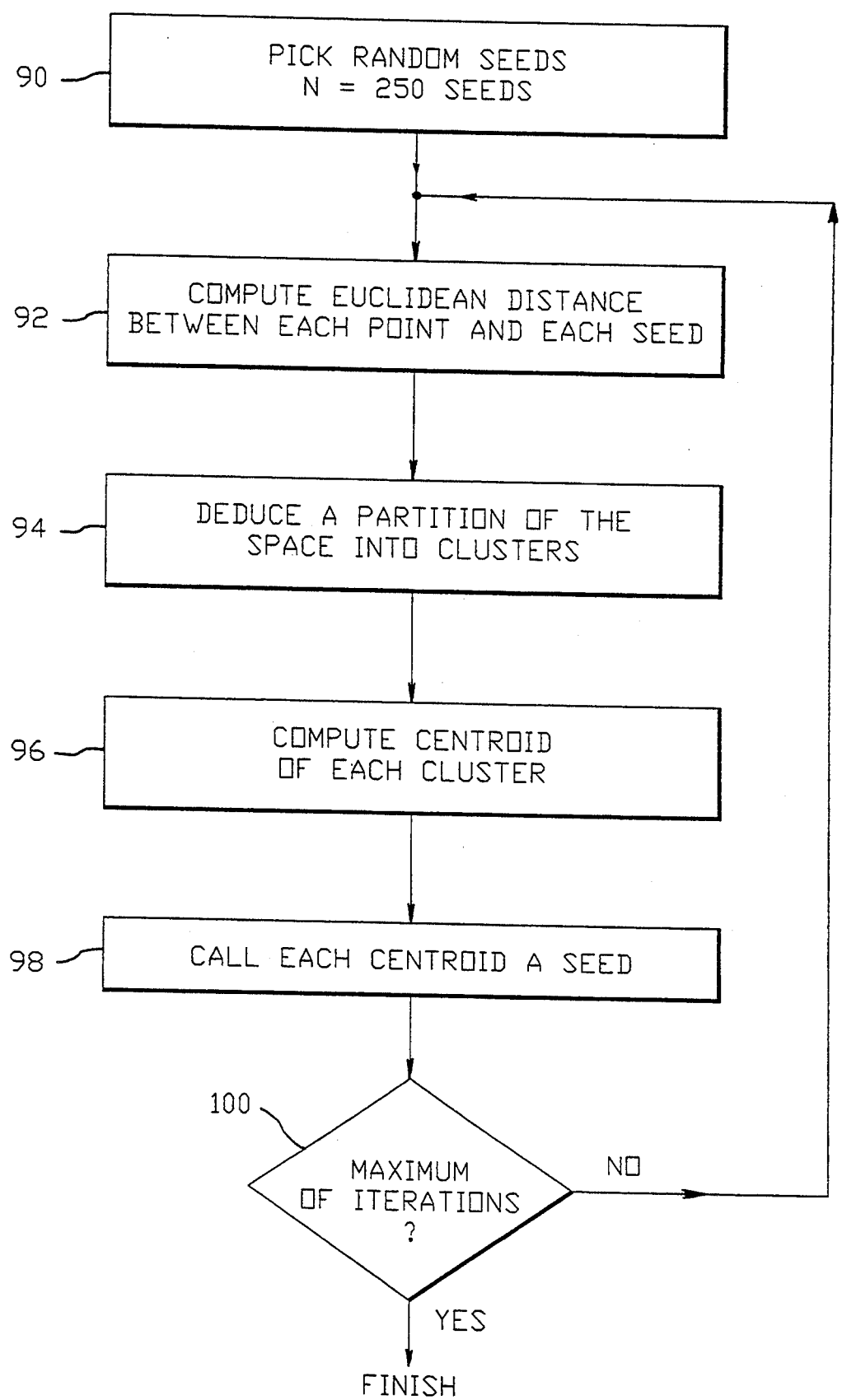
FIG. 20 is a flow chart detailing how the Euclidean K-means clustering block of FIG. 18 functions.

Refer to FIG. 20 which details block 79 of FIG. 18. A number of random seeds, chosen to be 250, is picked at block 90 from all the points in the chirographic space obtained from block 22 in FIG. 3. The Euclidean distance between each point and each seed is calculated at block 92. By assigning each point to its closest seed, the space is partioned into clusters at block 94. This corresponds to the clusters 84, 86 and 88 of FIG. 19. The centroid of each cluster is computed at block 96. This corresponds to the ⊗ in FIG. 19. These centroids are set to replace the original seeds at block 98. At decision block 100 a determination is made if the maximum number of iterations is reached. IF not, a return is made to block 92 and the steps are repeated as just described. If so, the calculation of the Euclidean clustering is complete.

Figure 21:
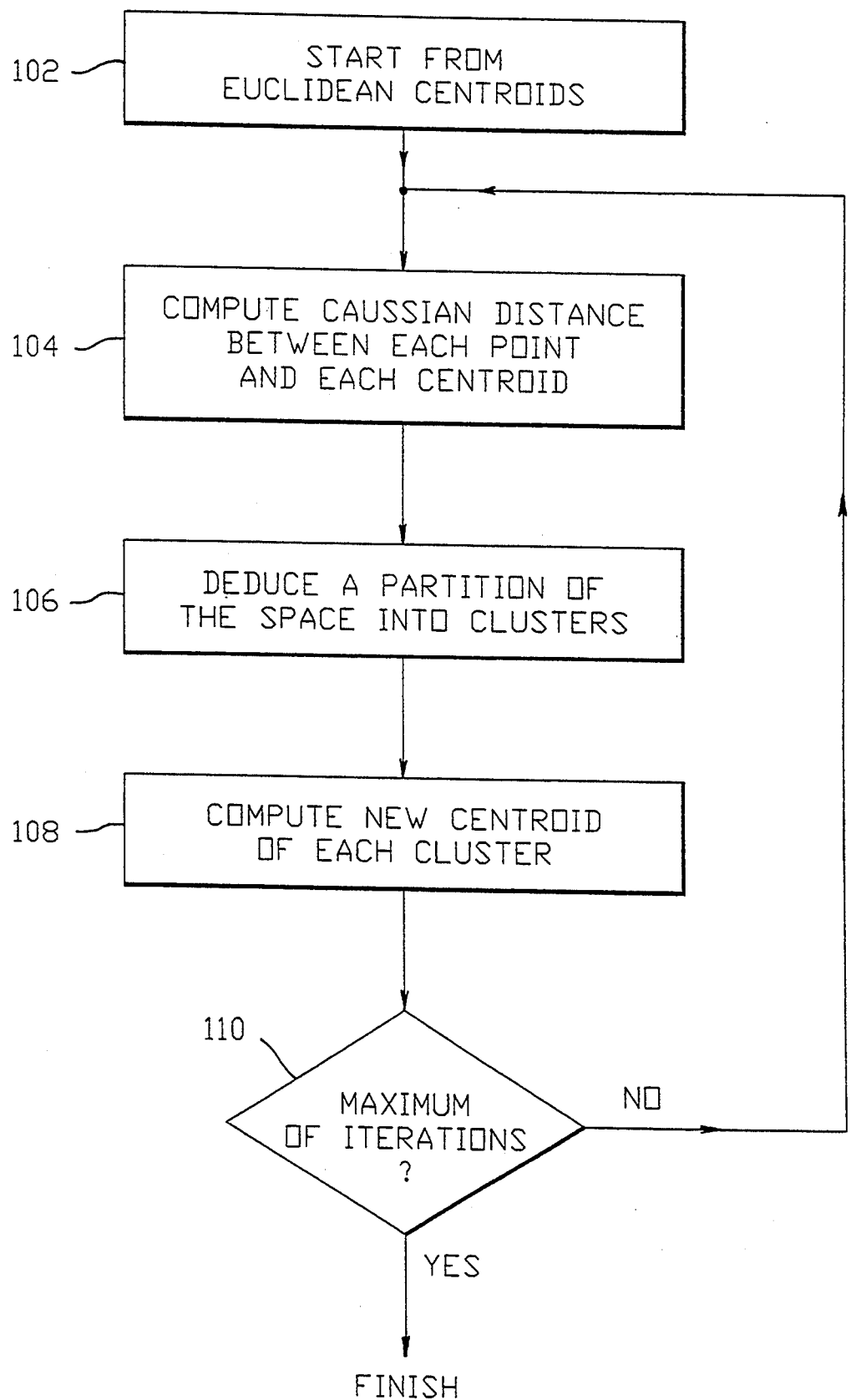
FIG. 21 is a flow chart detailing how the Gaussian K-means clustering block of FIG. 18 functions.

Refer to FIG. 21 which details the Gaussian clustering block 81 of FIG. 18. The Euclidean clusters obtained in block 79 (FIG. 18) are provided at block 102. The Gaussian distance between each point and each centroid is calculated at block 104. By assigning each point to its closest centroid, the space is partioned into clusters at block 106. The new centroid of each cluster is computed at block 108. At decision block 110 a determination is made if the maximum number of iterations is complete. If not, a return is made to block 104 and the steps are repeated as just described. If so, the calculations of the Gaussian clustering is complete. This results in final prototype distributions in chirographic space.

Figure 22:
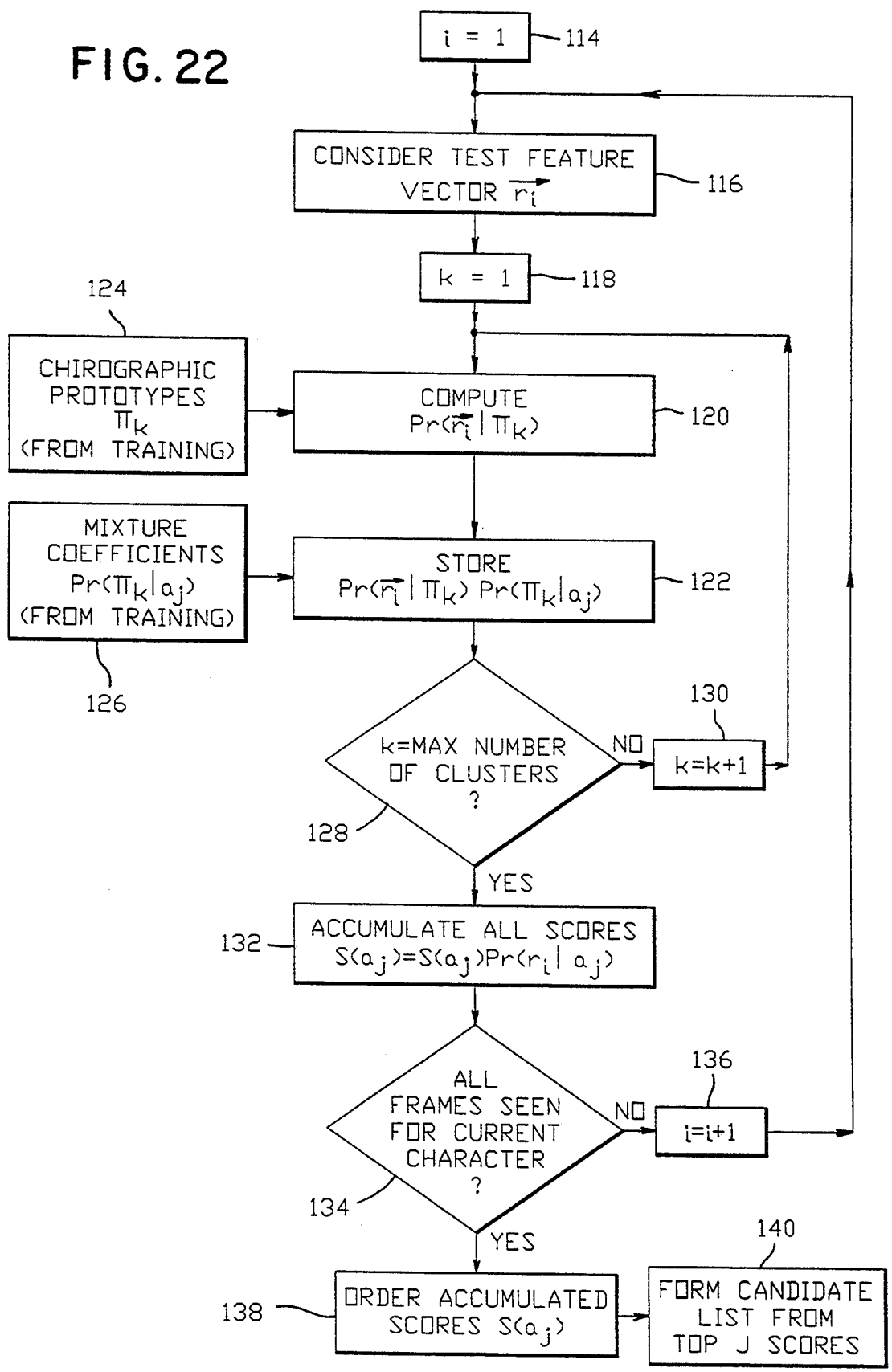
FIG. 22 is a flow chart detailing how the likelihood estimator block of FIG. 3 functions.

Refer to FIG. 22, which performs step 16 of the handwriting recognition algorithm for one codebook only, which illustrates how information resulting from steps 12 and 13 of the handwriting recognition algorithm is operated on by the likelihood estimator 28 of FIG. 3 to produce candidate characters for the decoder 30. At block 114 a variable i which is indicative of the current frame (or window center), is initialized to 1, and the test feature vector $r_i$ is provided from the front end parameter extraction 22 (FIG. 4) as indicated at block 116. At block 118 a variable k representative of the current prototype distribution is initialized to k=1. The conditional probability of this feature vector given this prototype distribution is computed at block 120 and is provided to block 122.

The prototype construction block 24 (FIG. 3) of the training phase as represented by the chirographic prototype distributions $\pi_k$ in block 124 and mixture coefficients $Pr(\pi_k|a_j)$ in block 126 are also provided to block 122 where the combined probability is computed and stored. At decision block 128 a determination is made if k has reached the maximum number of clusters. If not, k is incremented by 1 as indicated at block 130, and a return is made to block 120 and the just recited process is repeated. If so, the scores just stored are accumulated at block 132 for all characters $a_j$ in the underlying alphabet. At decision block 134 a determination is made if all frames i have been seen for the current character under consideration. If not, i is incremented by 1 at block 136 and a return is made to block 116 and the just recited process is repeated. If so, the accumulated scores are ordered in block 138 and a candidate list of characters $a_j$ is formed from the top J scores for provision to the decoder 30 (FIG. 3).

Figure 23:
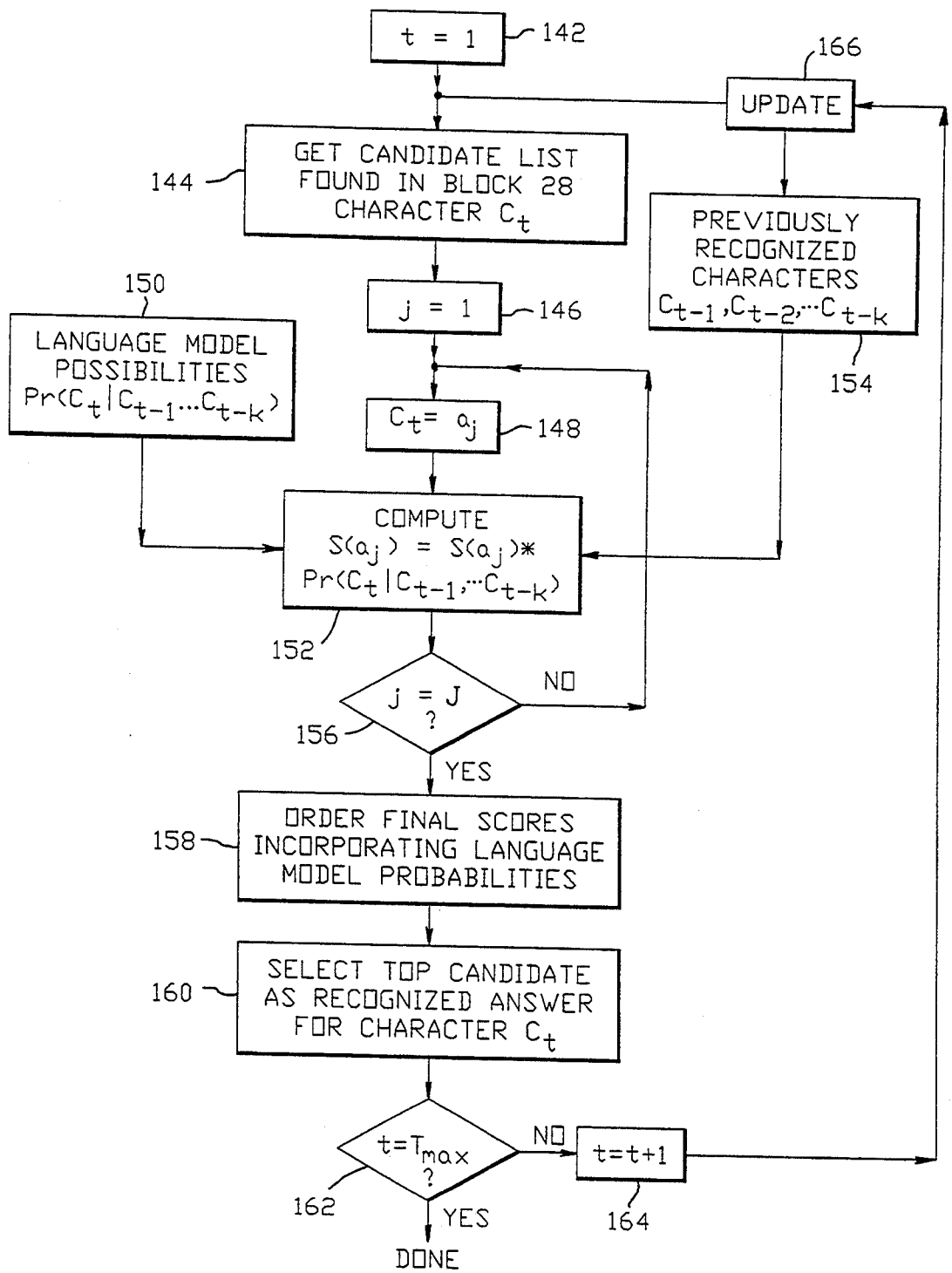
FIG. 23 is a flow chart detailing how the decoder block of FIG. 3 functions.

Refer now to FIG. 23 which is a flow chart representation indicative of the operation of the decoder 30 (FIG. 3). A variable t, which is indicative of the current character under consideration is initialized to 1 at block 142. The candidate list of characters from the likelihood estimator 28 (FIG. 3) for character $C_t$ is provided at block 144. A variable j indicative of the current candidate character is initialized at 1 at block 146, and $C_t$ is tentatively set equal to $a_j$ at block 148. From the training block, Language Model probabilities 26 (FIG. 3) are provided at block 150. Based on these probabilities and previously recognized characters at block 154, the final score of the character $a_j$ is computed at block 152. This score represents the likelihood that $C_t$ is recognized as $a_j$ taking into account the contextual information through the language model. At decision block 156 a determination is made if j=J, the index of the last candidate character in the candidate list provided by the likelihood estimator 28. If not, a return is made to block 148 and the just recited process is repeated. If so, final scores incorporating language model probabilities are ordered in block 158. The top candidate is selected as the recognized answer for character $C_t$ in block 160. At decision block 162 a determination is made if t=Tmax, the index of the last character in the string to be recognized. If not, t is incremented by 1 in block 164, to get the next character to be recognized. An update is made at block 166, to insert the recognized $C_t$ in block 154, and a return is made to block 144, witch the just recited process being repeated. If so, the process is complete as indicated at block 168 and the whole string of characters has been recognized.

INDUSTRIAL APPLICABILITY

It is an object of the invention to provide an improved handwriting recognition system.

It is another object of the invention to provide an improved handwriting recognition system in which input handwriting is signal processed to extract both local and global feature elements.

It is another further object of the invention to provide an improved handwriting recognition system in which windowing is utilized to detect broad feature events.

It is still a further object of the invention to provide an improved handwriting recognition system in which rotation/projection is utilized to eliminate redundancy.

It is yet another object of tim invention to provide an improved handwriting recognition system in which handwriting is recognized based on Gaussian modeling in a suitable Feature vector space, called a chirographic space.

It is a further object of the invention to provide an improved handwriting recognition system in which mixture decoding is utilized to take into account the contribution of all relative prototypes in a chirographic space.

It is still a further object of the invention to provide an improved handwriting recognition system in which multiple codebooks, corresponding to multiple chirographic spaces, are utilized to provide a more robust recognition.

We claim:

1. A handwriting recognition system comprising:
an electronic tablet for measuring the value of at least one feature of a handwriting stroke on the tablet at each of a plurality of different positions along the stroke to produce a set of feature vector signals representing the handwriting stroke;
means for storing a plurality of prototype signals, each prototype signal having at least one parameter value;
means for storing, for each character in an alphabet of characters and for each prototype signal, an estimate of the probability of occurrence of the prototype signal given the occurrence of the character;
means for generating a component character match score for a character and for a feature vector signal and a prototype signal, said component character match score comprising an estimate of the probability of occurrence of the feature vector signal given the occurrence of the prototype signal, combined with the probability of occurrence of the prototype signal given the occurrence of the character;

means for generating a partial character match score for a character and a feature vector signal, said partial character match score comprising a combination of the component character match scores for the character and the feature vector signal for all prototype signals;

means for generating a full character match score for a character and for all feature vector signals representing the handwriting stroke, said full character match score comprising a combination of the partial character match scores for the character and for all feature vector signals in the handwriting stroke;

means for identifying at least one best candidate character having the best full character match score; and means for outputting at least one best candidate character.

2. A handwriting recognition system as claimed in claim 1, characterized in that the output means comprises a display.

3. A handwriting recognition system as claimed in claim 2, characterized in that the full character match score for a candidate character further comprises an estimate of the probability of occurrence of the candidate character given the occurrence of one or more other characters preceding or following the candidate character.

4. A handwriting recognition system as claimed in claim 3, characterized in that:
each prototype signal comprises at least one mean parameter value and at least one variance parameter value; and
the probability of occurrence of a feature vector signal given the occurrence of a prototype signal is estimated as the Gaussian likelihood of the feature vector signal given the mean and variance of the prototype signal.

5. A handwriting recognition system as claimed in claim 3, characterized in that the electronic tablet measures the value of at least one local feature of a handwriting stroke on the tablet, and measures the value of at least one global feature of a handwriting stroke on the tablet.

6. A handwriting recognition system as claimed in claim 5, characterized in that:
the component character match score comprises an estimate of the product of the probability of occurrence of the feature vector signal given the occurrence of the prototype signal, multiplied by the probability of occurrence of the prototype signal given the occurrence of the character;
the partial character match score comprises the sum of the component character match scores for the character and the feature vector signal for all prototype signals; and
the full character match score comprises the product of the partial character match scores for the character and for all feature vector signals in the handwriting stroke.

7. A handwriting recognition method comprising the steps of:
measuring the value of at least one feature of a handwriting stroke on an electronic tablet at each of a plurality of different positions along the stroke to produce a set of feature vector signals representing the handwriting stroke;
storing a plurality of prototype signals, each prototype signal having at least one parameter value;
storing, for each character in an alphabet of characters and for each prototype signal, an estimate of the probability of occurrence of the prototype signal given the occurrence of the character;

generating a component character match score for a character and for a feature vector signal and a prototype signal, said component character match score comprising an estimate of the probability of occurrence of the feature vector signal given the occurrence of the prototype signal, combined with the probability of occurrence of the prototype signal given the occurrence of the character;

generating a partial character match score for a character and a feature vector signal, said partial character match score comprising a combination of the component character match scores foe the character and the feature vector signal for all prototype signals;

generating a full character match score for a character and for all feature vector signals representing the handwriting stroke, said full character match score comprising a combination of the partial character match scores for the character and for all feature vector signals in the handwriting stroke;

identifying at least one best candidate character having the best full character match score; and
outputting at least one best candidate character.

8. A handwriting recognition method as claimed in claim 7, characterized in that the step of outputting at least one best candidate character comprises displaying at least one best candidate character.

9. A handwriting recognition method as claimed in claim 8, characterized in that the full character match score for a candidate character further comprises an estimate of the probability of occurrence of the candidate character given the occurrence of one or more other characters preceding or following the candidate character.

10. A handwriting recognition method as claimed in claim 9, characterized in that:
each prototype signal comprises at least one mean parameter value and at least one variance parameter value; and
the probability of occurrence of a feature vector signal given the occurrence of a prototype signal is estimated as the Gaussian likelihood of the feature vector signal given the mean and variance of the prototype signal.

11. A handwriting recognition method as claimed in claim 10, characterized in that the step of measuring comprises measuring the value of at least one local feature of a handwriting stroke on the tablet, and measuring the value of at least one global feature of a handwriting stroke on the tablet.

12. A handwriting recognition method as claimed in claim 12, characterized in that:
the component character match score comprises an estimate of the product of the probability of occurrence of the feature vector signal given the occurrence of the prototype signal, multiplied by the probability of occurrence of the prototype signal given the occurrence of the character;
the partial character match score comprises the sum of the component character match scores for the character and the feature vector signal for all prototype signals; and
the full character match score comprises the product of the partial character match scores for the character and for all feature vector signals in the handwriting stroke.

* * * * *